US010402264B2

(12) United States Patent
Wang et al.

(10) Patent No.: US 10,402,264 B2
(45) Date of Patent: Sep. 3, 2019

(54) PACKET-AWARE FAULT-TOLERANCE METHOD AND SYSTEM OF VIRTUAL MACHINES APPLIED TO CLOUD SERVICE, COMPUTER READABLE RECORD MEDIUM AND COMPUTER PROGRAM PRODUCT

(71) Applicant: National Central University, Taoyuan (TW)

(72) Inventors: Wei-Jen Wang, Taoyuan (TW); Deron Liang, Taoyuan (TW); Min-Huang Ho, Taoyuan (TW)

(73) Assignee: National Central University, Taoyuan (TW)

( * ) Notice: Subject to any disclaimer, the term of this patent is extended or adjusted under 35 U.S.C. 154(b) by 26 days.

(21) Appl. No.: 15/707,882

(22) Filed: Sep. 18, 2017

(65) Prior Publication Data

US 2018/0083729 A1 Mar. 22, 2018

(30) Foreign Application Priority Data

Sep. 19, 2016 (TW) .............................. 105130142 A (51) Int. Cl.
*G06F 11/08* (2006.01)
*G06F 9/455* (2018.01)
(Continued)

(52) U.S. Cl.
CPC .......... *G06F 11/08* (2013.01); *G06F 9/45558* (2013.01); *G06F 11/1471* (2013.01);
(Continued)

(58) Field of Classification Search
CPC ............. G06F 11/1068; G06F 11/1072; G06F 11/1448; G06F 11/1451; G06F 11/1469;
(Continued)

(56) References Cited

U.S. PATENT DOCUMENTS

2015/0309886 A1* 10/2015 Tsai .................... G06F 11/1469
714/19
2015/0378833 A1* 12/2015 Misra .................. G06F 11/1448
714/19

FOREIGN PATENT DOCUMENTS

CN        100403293      7/2008
CN        101778091      7/2012
(Continued)

OTHER PUBLICATIONS

Search Report for Taiwan Patent Application No. 105130142, completed Feb. 23, 2017.

*Primary Examiner* — Shelly A Chase
(74) *Attorney, Agent, or Firm* — Ferguson Case Orr Paterson (57) ABSTRACT

The present disclosure relates to packet-aware fault tolerance methods of virtual machines applied to cloud services. One such method includes using a primary input processing unit to receive an uploaded packet and replicating the uploaded packet to a backup input processing unit. The method can further include utilizing a primary execution unit to operate the uploaded packet to generate an output packet, which is then transmitted to a processing unit. A backup execution unit can be used to operate the uploaded packet to generate a backup output packet. The backup output packet can be transmitted to a backup processing unit. A fault-tolerance control component can receive the primary output packet from the primary output processing unit. The primary fault-tolerance control component can be used to compare a primary packet checksum of the primary output packet is consistent with a backup packet checksum.

6 Claims, 4 Drawing Sheets

(51) Int. Cl.
*G06F 11/14* (2006.01)
*H04L 1/00* (2006.01)
(52) U.S. Cl.
CPC .......... *H04L 1/004* (2013.01); *G06F 11/1458* (2013.01); *G06F 2009/45591* (2013.01)
(58) Field of Classification Search
CPC .. G06F 11/08; G06F 11/1435; G06F 11/1458; G06F 11/1471; G06F 9/45558; H04L 1/004; H04L 41/0695
See application file for complete search history.

(56) References Cited

FOREIGN PATENT DOCUMENTS

| | | |
|---|---|---|
| TW | 201235947 | 9/2012 |
| TW | 201532412 | 8/2015 |

\* cited by examiner

PACKET-AWARE FAULT-TOLERANCE METHOD AND SYSTEM OF VIRTUAL MACHINES APPLIED TO CLOUD SERVICE, COMPUTER READABLE RECORD MEDIUM AND COMPUTER PROGRAM PRODUCT

BACKGROUND

Technical Field

The present invention relates to the technical field of computers, and in particular, to a packet-aware fault-tolerance method and system for virtual machines applied to cloud services, a computer readable record medium and a computer program product.

Related Art

With extensive applications of the virtualization technology, virtual machines hosting various Internet services are deployed on a cloud compute pool. A fault-tolerance service based on the virtualization technology plays an important role in protecting mission-critical services, because it can let the services provide uninterrupted operation without users' awareness.

A fault-tolerance technology for virtual machines is mainly based on backup virtual machines. That is to say, a virtual machine as a backup is executed on one physical host, while the primary virtual machine that hosts mission-critical services is executed on another physical host, and both maintain uninterrupted state synchronization through a continuous checkpointing technology. While a failure is detected by the backup, it has to replace the role of the primary virtual machine by performing recovery operations.

A conventional Kemari is an open-source project enabling the virtualization fault-tolerance technology based on Kernel Virtual Machine (KVM), which supports continuous execution through the continuous checkpointing technology between two virtual machines on different physical hosts respectively.

The Kemari, by modifying a system architecture from QEMU-KVM Live Migration, constantly transmits a memory state and a device state of the primary virtual machine onto a backup virtual machine to achieve the state synchronization. The Kemari constantly synchronizes a state onto the backup virtual machine from a primary virtual machine, and when a failure occurs in the primary virtual machine, the backup virtual machine can resume the original operations on the primary virtual machine after detecting the failure.

However, when the Kemari synchronizes the primary virtual machine and the backup virtual machine with a continuous checkpointing method that is triggered by every external event, execution on the primary virtual machine may often be stopped, thus seriously affecting the efficiency of the primary virtual machine.

SUMMARY

In view of the above problems, an objective of the present invention is to provide a packet-aware fault-tolerance method and system of virtual machines applied to cloud services, a computer readable record medium and a computer program product, which use an improved architecture to make an optimized design for fault tolerance of a cloud virtual machine that provides network services. The present invention reduces resource consumption required by a fault-tolerance system by a novel synchronization mechanism in a manner of packet comparison, thereby enhancing the efficiency of the primary virtual machine.

A first aspect of the present invention provides a packet-aware fault-tolerance method of a virtual machine applied to cloud services, the method being applied to a primary host provided with a primary physical machine layer, a primary virtual machine monitor layer and a primary virtual machine layer disposed on the primary physical machine layer, and a backup host provided with a backup physical machine layer, a backup virtual machine monitor layer and a backup virtual machine layer disposed on the backup physical machine layer, the method including the following steps:

receiving, by a primary input processing unit of the primary virtual machine layer, an uploaded packet uploaded to the cloud services;

replicating, by the primary input processing unit, the uploaded packet to a backup input processing unit of the backup virtual machine layer;

operating, by a primary execution unit of the primary virtual machine monitor layer, the uploaded packet in the primary input processing unit to generate a primary output packet, and transmitting the primary output packet to a primary output processing unit of the primary virtual machine layer, and operating, by a backup execution unit of the backup virtual machine monitor layer, the uploaded packet in the backup input processing unit to generate a backup output packet, and transmitting the backup output packet to a backup output processing unit of the backup virtual machine layer;

receiving, by a primary fault-tolerance control component of the primary virtual machine layer, the primary output packet transmitted by the primary output processing unit, and receiving a backup packet checksum of the backup output packet transmitted by the backup output processing unit; and comparing, by the primary fault-tolerance control component, whether a primary packet checksum of the primary output packet is consistent with the backup packet checksum, to judge whether a virtual machine of the primary host is synchronous with a virtual machine of the backup host.

A second aspect of the present invention provides a packet-aware fault-tolerance system of a virtual machine applied to cloud services, the system including:

a primary host, comprising:
a primary physical machine layer;
a primary virtual machine monitor layer disposed on the primary physical machine layer, comprising:
a primary execution unit that operates an uploaded packet to generate a primary output packet; and
a primary virtual machine layer, comprising:
a primary input processing unit that receives the uploaded packet uploaded to the cloud services, and transmits the uploaded packet to the primary execution unit;
a primary output processing unit that receives the primary output packet transmitted by the primary execution unit; and
a primary fault-tolerance control component that receives a backup packet checksum and the primary output packet transmitted by the primary output processing unit, and compares whether a primary packet checksum of the primary output packet is consistent with the backup packet checksum; and a backup host, comprising:
a backup physical machine layer;
a backup virtual machine monitor layer disposed on the backup physical machine layer, comprising:
a backup execution unit that operates the uploaded packet to generate a backup output packet; and and a backup virtual machine layer, comprising:

a backup input processing unit, wherein the primary input processing unit replicates the uploaded packet to the backup input processing unit, and transmits the uploaded packet to the backup execution unit; and a backup output processing unit that receives the backup output packet transmitted by the backup execution unit, and transmits the backup packet checksum of the backup output packet to the primary fault-tolerance control component.

A third aspect of the present invention provides a computer readable record medium with a program stored therein, wherein, after the program is loaded into a packet-aware fault-tolerance system of a virtual machine applied to cloud services and executed at the computer readable record medium, the method in the first aspect of the present invention can be completed.

A fourth aspect of the present invention provides a computer program product with a program stored therein, wherein, after the program is loaded into a packet-aware fault-tolerance system of a virtual machine applied to cloud services and executed at the computer readable record medium, the method in the first aspect of the present invention can be completed.

DETAILED DESCRIPTION

To enable those of ordinary skill in the art to further understand the present invention, constitution contents and the effect to be achieved of the present invention are described hereinafter in detail with reference to preferred embodiments of the present invention and the accompanying drawings.

Figure 1:
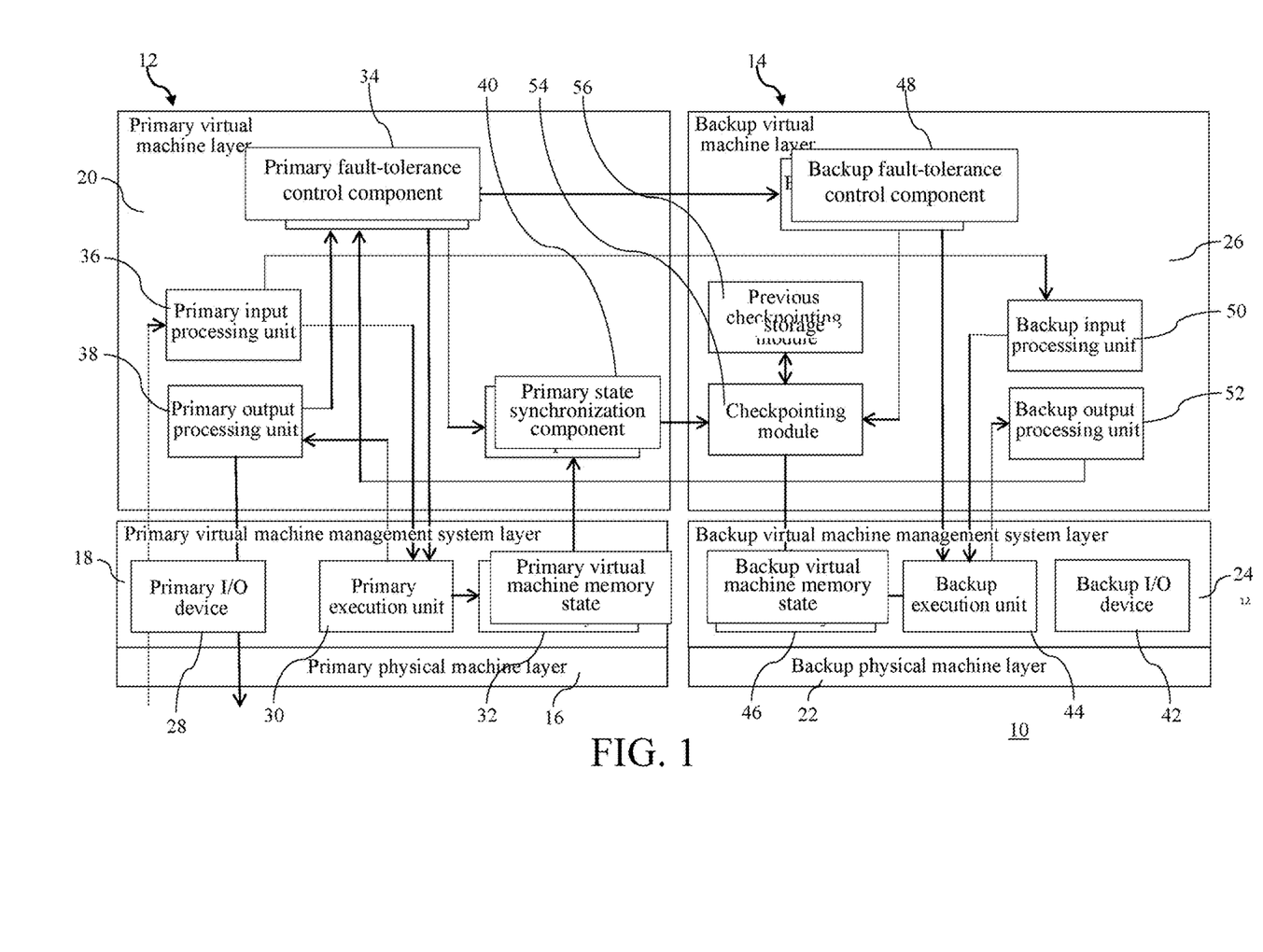
FIG. 1 is a block diagram of a packet-aware fault-tolerance system of a virtual machine applied to cloud services according to the present invention.

FIG. 1 is a block diagram of a packet-aware fault-tolerance system of a virtual machine applied to cloud services according to the present invention. In FIG. 1, the packet-aware fault-tolerance system 10 includes a primary host 12 and a back host 14. The primary host 12 includes a primary physical machine layer 16, a primary virtual machine monitor layer 18, and a primary virtual machine layer 20. For example, the primary virtual machine monitor layer 18 which is a KVM is disposed on the primary physical machine layer 16. The backup host 14 includes a backup physical machine layer 22, a backup virtual machine monitor layer 24 and a backup virtual machine layer 26. For example, the back virtual machine monitor layer 24 which is a KVM is disposed on the backup physical machine layer 22.

The primary virtual machine monitor layer 18 includes a primary I/O device 28, a primary execution unit 30, and a primary virtual machine memory state 32. The primary virtual machine layer 20 includes a primary fault-tolerance control component 34, a primary input processing unit 36, a primary output processing unit 38, and a primary state fault-tolerance component 40.

The backup virtual machine monitor layer 24 includes a backup I/O device 42, a backup execution unit 44, and a backup virtual machine memory state 46. The backup virtual machine layer 26 includes a backup fault-tolerance control component 48, a backup input processing unit 50, a backup output processing unit 52, a checkpointing module 54, and a previous checkpointing storage 56.

An uploaded packet uploaded by a user terminal (not shown) to the cloud services is first transferred by an operating system of the primary physical machine layer 16 to the primary I/O device 28, which is simulated with a peripheral drive, of the primary virtual machine monitor layer 18. Then, the primary fault-tolerance control component 34 controls the primary input processing unit 36, and the primary input processing unit 36 receives the uploaded packet transmitted by the primary I/O device 28.

When the primary input processing unit 36 is to replicate the uploaded packet to the backup input processing unit 50, the primary fault-tolerance control component 34 may stop the primary execution unit 30 for simulating a processor from operating, the primary fault-tolerance control component 34 may notify the backup fault-tolerance control unit 48, the backup fault-tolerance control unit 48 stops the backup execution unit 44 for simulating a processor from operating, and then the primary fault-tolerance control component 34 controls the primary input processing unit 36 to replicate the uploaded packet to the backup input processing unit 50.

After the primary input processing unit 36 replicates the uploaded packet to the backup input processing unit 50, the primary fault-tolerance control component 34 starts the primary execution unit 30 to operate the uploaded packet in the primary input processing unit 36, and a primary output packet generated through operation is transmitted into the primary output processing unit 38; moreover, the primary fault-tolerance control component 34 notifies the backup fault-tolerance control unit 48 to operate the packet, making the backup fault-tolerance control unit 48 start the backup execution unit 44 to operate the uploaded packet in the backup input processing unit 50, and a backup output packet generated through operation is transmitted into the backup output processing unit 52.

The primary execution unit 30 may read and write data of the primary virtual machine memory state 32 used as a simulated memory when executing an operation, to generate data of a dirty page of the primary virtual machine memory state 32, and the backup execution unit 44 may read and write data of the backup virtual machine memory state 46 used as a simulated memory when executing an operation, to generate data of a dirty page of the backup virtual machine memory state 46.

When the primary execution unit 30 generates a primary output packet, the primary fault-tolerance control component 34 may stop the operation of the primary execution unit 30, and the primary fault-tolerance control component 34 requires the backup fault-tolerance control component 48 to stop the operation of the backup execution unit 44, to synchronize a virtual machine of the primary host 12 with a virtual machine of the backup host 14.

The primary output processing unit 38 temporarily stores the primary output packet into the primary fault-tolerance control component 34, and the backup output processing unit 52 transmits a backup packet checksum of the backup output packet into the primary fault-tolerance control component 34.

The primary fault-tolerance control component 34 compares a primary packet checksum of the primary output packet with the backup packet checksum, to judge whether the primary packet checksum is consistent with the backup packet checksum. The primary fault-tolerance control component 34 judges that the virtual machine of the primary host 12 is asynchronous with the virtual machine of the backup host 14 in any of the following situations: it is compared that the primary packet checksum of the primary output packet is inconsistent with the backup packet checksum, an unexpected backup packet checksum is received, and an expected backup packet checksum is not received.

When the virtual machine of the primary host 12 is synchronous with the virtual machine of the backup host 14, the primary fault-tolerance control component 34 controls the primary output processing unit 38, the primary output processing unit 38 transmits the primary output packet to the primary I/O device 28, and the operating system of the primary physical machine layer 16 downloads a cloud service for the primary output packet in the primary I/O device 28, to download the primary output packet onto the user terminal.

The primary fault-tolerance control component 34 sends a result of synchronization to the backup fault-tolerance control component 48, the backup output processing unit 52 (that is, the backup host 14) may not output any backup output packet, the backup fault-tolerance control component 48 controls the checkpointing module 54 to access data (including the data of the dirty page) of the backup virtual machine memory state 46 to back up in the previous checkpointing storage 56, and the backup data is used as data of the synchronization between the virtual machine of the primary host 12 and the virtual machine of the backup host 14.

When the virtual machine of the primary host 12 is asynchronous with the virtual machine of the backup host 14 (that is, in any of the above three situations), the primary fault-tolerance control component 34 controls the primary state fault-tolerance component 40 to access the data of the dirty page in the primary virtual machine memory state 32 as synchronous updated data, and transmits the synchronous updated data to the checkpointing module 54.

The primary fault-tolerance control component 34 sends a result of asynchronization to the backup fault-tolerance control component 48, to synchronize the virtual machine of the primary host 12 with the virtual machine of the backup host 14, the backup fault-tolerance control component 48 controls the checkpointing module 54 to integrate previous synchronous data in the previous checkpointing storage 56 with the synchronous updated data, to become checkpointing synchronous data, and next, the checkpointing module 54 backs up and updates the previous checkpointing storage 56 and the backup virtual machine memory state 46 with the checkpointing synchronous data, and the data backed up and updated is used as data of the synchronization between the virtual machine of the primary host 12 and the virtual machine of the backup host 14.

When the synchronization between the virtual machine of the primary host 12 and the virtual machine of the backup host 14 is completed, the backup fault-tolerance control component 48 sends a synchronization end signal to the primary fault-tolerance control component 34, making the primary fault-tolerance control component 34 control the primary output processing unit 38, the primary output processing unit 38 transmits the primary output packet to the primary I/O device 28, and the operating system of the primary physical machine layer 16 downloads a cloud service for the primary output packet in the primary I/O device 28, to download the primary output packet onto the user terminal.

Figure 2:
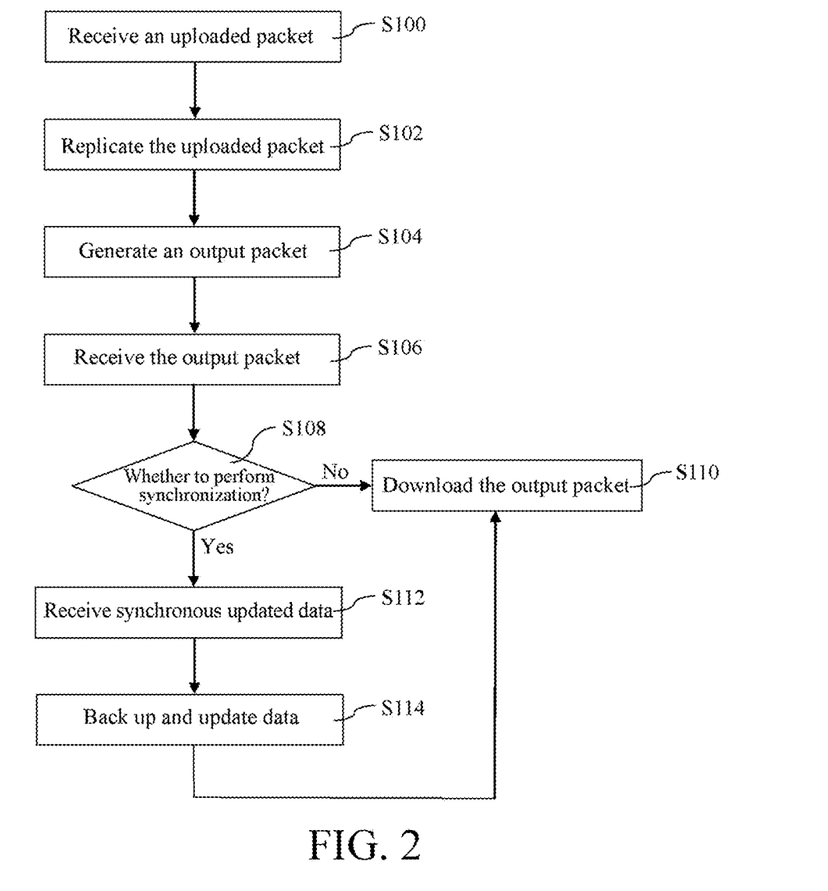
FIG. 2 is a flow chart of a packet-aware fault-tolerance method of a virtual machine applied to cloud services according to the present invention.

FIG. 2 is a flow chart of a packet-aware fault-tolerance method of a virtual machine applied to cloud services according to the present invention. When the flow of FIG. 2 is described, reference is also made to the description about the component symbols of FIG. 1.

In FIG. 2, an uploaded packet uploaded by a user terminal (not shown) to the cloud services is first transferred by an operating system of the primary physical machine layer 16 to the primary I/O device 28 of the primary virtual machine monitor layer 18. Then, the primary fault-tolerance control component 34 controls the primary input processing unit 36, and the primary input processing unit 36 receives the uploaded packet transmitted by the primary I/O device 28 (step S100).

Next, the primary input processing unit 36 replicates the uploaded packet to a backup input processing unit 50, at this point, the primary fault-tolerance control component 34 may stop the primary execution unit 30 from operating, the primary fault-tolerance control component 34 may notify the backup fault-tolerance control unit 48, the backup fault-tolerance control unit 48 stops the backup execution unit 44 from operating, and then the primary fault-tolerance control component 34 controls the primary input processing unit 36 to replicate the uploaded packet to the backup input processing unit 50 (step S102).

After the primary input processing unit 36 replicates the uploaded packet to the backup input processing unit 50, the primary fault-tolerance control component 34 starts the primary execution unit 30 to operate the uploaded packet in the primary input processing unit 36, may read and write data of the primary virtual machine memory state 32 when executing an operation, to generate data of a dirty page of the primary virtual machine memory state 32, and a primary output packet generated through operation performed by the primary execution unit 30 is transmitted into the primary output processing unit 38; moreover, the primary fault-tolerance control component 34 notifies the backup fault-tolerance control unit 48 to operate the packet, making the backup fault-tolerance control unit 48 start the backup execution unit 44 to operate the uploaded packet in the backup input processing unit 50, which may read and write data of the backup virtual machine memory state 46 when executing an operation, to generate data of a dirty page of the backup virtual machine memory state 46, and a backup output packet generated through operation performed by the backup execution unit 44 is transmitted into the backup output processing unit 52 (step S104).

When the primary execution unit 30 generates a primary output packet, the primary fault-tolerance control component 34 may stop the operation of the primary execution unit 30, and the primary fault-tolerance control component 34 requires the backup fault-tolerance control component 48 to stop the operation of the backup execution unit 44, to synchronize a virtual machine of the primary host 12 with a virtual machine of the backup host 14.

The primary output processing unit 38 temporarily stores the primary output packet into the primary fault-tolerance control component 34, and the backup output processing unit 52 transmits a backup packet checksum of the backup output packet into the primary fault-tolerance control component 34 (step S106).

The primary fault-tolerance control component 34 compares a primary packet checksum of the primary output packet with the backup packet checksum, to judge whether the primary packet checksum is consistent with the backup packet checksum, that is, to judge whether the virtual machine of the primary host 12 is synchronous with the virtual machine of the backup host 14 (step S108). The primary fault-tolerance control component 34 judges that the virtual machine of the primary host 12 is asynchronous with the virtual machine of the backup host 14 in any of the following situations: it is compared that the primary packet checksum of the primary output packet is inconsistent with the backup packet checksum, an unexpected backup packet checksum is received, and an expected backup packet checksum is not received.

If the virtual machine of the primary host 12 is synchronous with the virtual machine of the backup host 14, the primary fault-tolerance control component 34 controls the primary output processing unit 38, the primary output processing unit 38 transmits the primary output packet to the primary I/O device 28, and the operating system of the primary physical machine layer 16 downloads a cloud service for the primary output packet in the primary I/O device 28, to download the primary output packet onto the user terminal (step S110).

The primary fault-tolerance control component 34 sends a result of synchronization to the backup fault-tolerance control component 48, the backup output processing unit 52 (that is, the backup host 14) may not output any backup output packet, the backup fault-tolerance control component 48 controls the checkpointing module 54 to access data (including the data of the dirty page) of the backup virtual machine memory state 46 to back up in the previous checkpointing storage 56, and the backup data is used as data of the synchronization between the virtual machine of the primary host 12 and the virtual machine of the backup host 14.

If the virtual machine of the primary host 12 is asynchronous with the virtual machine of the backup host 14 (that is, in any of the above three situations), the primary fault-tolerance control component 34 controls the primary state fault-tolerance component 40 to access the data of the dirty page in the primary virtual machine memory state 32 as synchronous updated data, and transmits the synchronous updated data to the checkpointing module 54 (step S112).

The primary fault-tolerance control component 34 sends a result of asynchronization to the backup fault-tolerance control component 48, to synchronize the virtual machine of the primary host 12 with the virtual machine of the backup host 14, the backup fault-tolerance control component 48 controls the checkpointing module 54 to integrate previous synchronous data in the previous checkpointing storage 56 with the synchronous updated data, to become checkpointing synchronous data, and next, the checkpointing module 54 backs up and updates the previous checkpointing storage 56 and the backup virtual machine memory state 46 with the checkpointing synchronous data, and the data backed up and updated is used as data of the synchronization between the virtual machine of the primary host 12 and the virtual machine of the backup host 14 (step S114).

When the synchronization between the virtual machine of the primary host 12 and the virtual machine of the backup host 14 is completed, the backup fault-tolerance control component 48 sends a synchronization end signal to the primary fault-tolerance control component 34, to perform the program of step S110.

Figure 3:
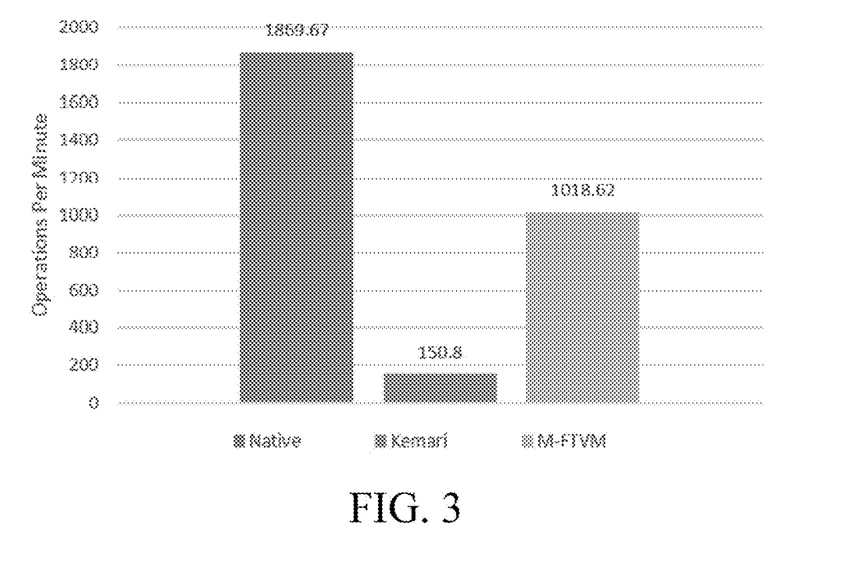
FIG. 3 is a diagram of comparison between the present invention and the prior art about Operations Per Minute.
Figure 4:
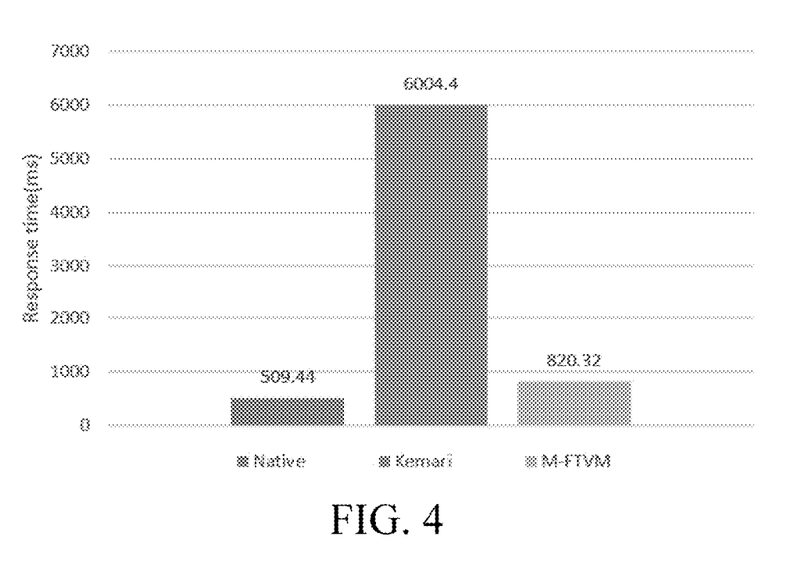
FIG. 4 is a diagram of comparison between the present invention and the prior art about Response time.

The packet-aware fault-tolerance method and system of a virtual machine applied to cloud services of the present invention reduce computing resources required by a fault-tolerance system synchronization mechanism of a virtual machine in a manner of packet comparison, as shown in FIG. 3 which is a diagram of comparison between the present invention and the prior art about Operations Per Minute (OPM) and FIG. 4 which is a diagram of comparison between the present invention and the prior art about Response time. A used experimental environment is two 4-core i7-3770CPU computers, having a memory of 4 GB, a disk of 500 GB and a network interface of 1 Gbps, and testing software of DVD store benchmark is adopted for testing. The testing software is developed by Dell, which simulates traffic of a DVD store webpage, a user can perform actions such as register an account and search for DVD on a database designed by the user, the OPM, response time and other quantized data of the database system is obtained through a transaction request for the database, and in the figures, Native refers to the efficacy without execution of fault tolerance, M-FVTM indicates the efficacy of the present invention, and Kemari indicates the efficacy of the prior art.

In FIG. 3, the OPM of Native is 1869.67, the OPM of M-FVTM of the present invention is 1018.62, and the OPM of the conventional Kemari is 150.8, from which it can be found that the OPM of the present invention is higher than that of Kemari. In FIG. 4, the response time of Native is 509.44 ms, the response time of M-FVTM of the present invention is 820.32 ms, and the response time of the conventional Kemari is 6004.4 ms, from which it can be found that the response time of the present invention is better than that of Kemari.

The packet-aware fault-tolerance method of a virtual machine applied to cloud services of the present invention can be completed in a program form, and the program can be stored in a computer readable record medium, and after the program is loaded into a packet-aware fault-tolerance system of a virtual machine applied to cloud services and executed at the computer readable record medium, the steps of the method as shown in the above description and figures can be completed.

Similarly, the method of the present invention can be completed with a computer program product, and after a packet-aware fault-tolerance system of a virtual machine applied to cloud services, for example, loads the computer program product from a network and executes it, the steps of the method as shown in the above description and figures can be completed.

The present invention provides a packet-aware fault-tolerance method and system of a virtual machine applied to cloud services, a computer readable record medium and a computer program product, of which the advantages lie in using an improved architecture to make optimized design for fault tolerance of a cloud virtual machine that provides network services, and reducing computing resources required by a fault-tolerance system synchronization mechanism in a manner of packet comparison, thereby enhancing the efficacy of the primary virtual machine.

Although the present invention has been stated as above with reference to the preferred embodiments and exemplary drawings, the preferred embodiments and exemplary drawings should not be regarded as limitations. Various modifications, omissions and variations made to the forms and contents of the embodiments by those skilled in the art do not depart from the scope claimed by the claims of the present invention.

DESCRIPTION ABOUT REFERENCE SIGNS

10 packet-aware fault-tolerance system
12 primary host 14 backup host
16 primary physical machine layer
18 primary virtual machine monitor layer
20 primary virtual machine layer
22 backup physical machine layer
24 backup virtual machine monitor layer
26 backup virtual machine layer
28 primary I/O device
30 primary execution unit
32 primary virtual machine memory state
34 primary fault-tolerance control component
36 primary input processing unit
38 primary output processing unit
40 primary state fault-tolerance component
42 backup I/O device
44 backup execution unit
46 backup virtual machine memory state
48 backup fault-tolerance control component
50 backup input processing unit
52 backup output processing unit
54 checkpointing module
56 previous checkpointing storage

What is claimed is:

1. A packet-aware fault-tolerance method of a virtual machine applied to cloud services, the method being applied to a primary host provided with a primary physical machine layer, a primary virtual machine monitor layer and a primary virtual machine layer disposed on the primary physical machine layer, and a backup host provided with a backup physical machine layer, a backup virtual machine monitor layer and a backup virtual machine layer disposed on the backup physical machine layer, the method comprising the following steps:

receiving, by a primary input processing unit of the primary virtual machine layer, an uploaded packet uploaded to the cloud services;

replicating, by the primary input processing unit, the uploaded packet to a backup input processing unit of the backup virtual machine layer;

operating, by a primary execution unit of the primary virtual machine monitor layer, the uploaded packet in the primary input processing unit to generate a primary output packet, and transmitting the primary output packet to a primary output processing unit of the primary virtual machine layer, and operating, by a backup execution unit of the backup virtual machine monitor layer, the uploaded packet in the backup input processing unit to generate a backup output packet, and transmitting the backup output packet to a backup output processing unit of the backup virtual machine layer;

receiving, by a primary fault-tolerance control component of the primary virtual machine layer, the primary output packet transmitted by the primary output processing unit, and receiving a backup packet checksum of the backup output packet transmitted by the backup output processing unit; and comparing, by the primary fault-tolerance control component, whether a primary packet checksum of the primary output packet is consistent with the backup packet checksum, to judge whether a virtual machine of the primary host is synchronous with a virtual machine of the backup host.

2. The method according to claim 1, wherein, in the step of comparing, by the primary fault-tolerance control component, whether a primary packet checksum of the primary output packet is consistent with the backup packet checksum, the primary fault-tolerance control component judges that the virtual machine of the primary host is asynchronous with the virtual machine of the backup host in any of the following situations: it is compared that the primary packet checksum of the primary output packet is inconsistent with the backup packet checksum, an unexpected backup packet checksum is received, and an expected backup packet checksum is not received.

3. The method according to claim 1, after the step of comparing, by the primary fault-tolerance control component, whether a primary packet checksum of the primary output packet is consistent with the backup packet checksum, comprising the following steps:

if the primary packet checksum is consistent with the backup packet checksum, downloading, by the primary output processing unit, a cloud service for the primary output packet;

if the primary packet checksum is inconsistent with the backup packet checksum, accessing, by a primary state fault-tolerance component of the primary virtual machine layer, data of a dirty page in a primary virtual machine memory state of the primary virtual machine monitor layer as synchronous updated data, and transmitting the synchronous updated data to a checkpointing module of the backup virtual machine layer, wherein the data of the dirty page is data of reading and writing the primary virtual machine memory state by the primary execution unit;

integrating, by the checkpointing module, previous synchronous data in a previous checkpointing storage of the backup virtual machine layer with the synchronous updated data, to become checkpointing synchronous data;

updating, by the checkpointing module, the previous checkpointing storage and a backup virtual machine memory state of the backup virtual machine monitor layer with the checkpointing synchronous data; and downloading, by the primary output processing unit, a cloud service for the primary output packet.

4. A packet-aware fault-tolerance system of a virtual machine applied to cloud services, the system comprising:
a primary host, comprising:
a primary physical machine layer;
a primary virtual machine monitor layer disposed on the primary physical machine layer, comprising:
a primary execution unit that operates an uploaded packet to generate a primary output packet; and
a primary virtual machine layer, comprising:
a primary input processing unit that receives the uploaded packet uploaded to the cloud services, and transmits the uploaded packet to the primary execution unit;
a primary output processing unit that receives the primary output packet transmitted by the primary execution unit; and
a primary fault-tolerance control component that receives a backup packet checksum and the primary output packet transmitted by the primary output processing unit, and compares whether a primary packet checksum of the primary output packet is consistent with the backup packet checksum; and
a backup host, comprising:
a backup physical machine layer;
a backup virtual machine monitor layer disposed on the backup physical machine layer, comprising:
a backup execution unit that operates the uploaded packet to generate a backup output packet; and and a backup virtual machine layer, comprising:
a backup input processing unit, wherein the primary input processing unit replicates the uploaded packet to the backup input processing unit, and transmits the uploaded packet to the backup execution unit; and
a backup output processing unit that receives the backup output packet transmitted by the backup execution unit, and transmits the backup packet checksum of the backup output packet to the primary fault-tolerance control component.

5. The system according to claim 4, wherein the primary fault-tolerance control component judges that a virtual machine of the primary host is asynchronous with a virtual machine of the backup host in any of the following situations: it is compared that the primary packet checksum of the primary output packet is inconsistent with the backup packet checksum, an unexpected backup packet checksum is received, and an expected backup packet checksum is not received.

6. The system according to claim 4, further comprising:
downloading, by the primary output processing unit, a cloud service for the primary output packet;
accessing, by a primary state fault-tolerance component of the primary virtual machine layer, data of a dirty page in a primary virtual machine memory state of the primary virtual machine monitor layer as synchronous updated data, and transmitting the synchronous updated data to a checkpointing module of the backup virtual machine layer, wherein the data of the dirty page is data of reading and writing the primary virtual machine memory state by the primary execution unit;
backing up, by a previous checkpointing storage of the backup virtual machine layer, previous synchronous data; and
receiving, by a checkpointing module of the backup virtual machine layer, the synchronous updated data transmitted by the primary fault-tolerance control component, integrating previous synchronous data in the previous checkpointing storage with the synchronous updated data, to become checkpointing synchronous data, and updating the previous checkpointing storage and a backup virtual machine memory state of the backup virtual machine monitor layer with the checkpointing synchronous data.

* * * * *